United States Patent [19]

Granville

[11] Patent Number: 4,549,866
[45] Date of Patent: Oct. 29, 1985

[54] METHOD AND APPARATUS FOR APPLYING HEAT TO ARTICLES AND MATERIALS

[75] Inventor: Clive W. Granville, Yonkers, N.Y.

[73] Assignee: Flynn Burner Corporation, New Rochelle, N.Y.

[21] Appl. No.: 608,125

[22] Filed: May 8, 1984

[51] Int. Cl.[4] .......................... F27D 5/00; F24H 1/00; F24J 3/00
[52] U.S. Cl. ......................................... 432/10; 432/11; 432/12; 432/222; 432/226; 432/230
[58] Field of Search ....................... 432/10, 11, 12, 17, 432/18, 222, 226, 230

[56] References Cited

U.S. PATENT DOCUMENTS

| | | | |
|---|---|---|---|
| 3,437,322 | 4/1969 | Flynn | 263/19 |
| 3,541,190 | 11/1970 | Flynn | 263/52 |
| 3,794,459 | 2/1974 | Meenan | 431/5 |
| 3,825,406 | 7/1974 | Heath | 432/222 |
| 4,048,927 | 9/1977 | Friedehelm et al. | 110/8 |
| 4,124,353 | 11/1978 | Prudhon et al. | 431/8 |
| 4,156,394 | 5/1979 | Mallek et al. | 110/346 |
| 4,175,919 | 11/1979 | Matsumoto et al. | 431/114 |
| 4,235,591 | 11/1980 | Aebli | 432/8 |
| 4,278,418 | 7/1981 | Strenkert | 431/8 |
| 4,297,093 | 10/1981 | Morimoto et al. | 431/10 |

*Primary Examiner*—John J. Camby
*Attorney, Agent, or Firm*—Fitzpatrick, Cella, Harper & Scinto

[57] ABSTRACT

A heating device including a flame burner (40) and a nozzle (52) into which the flame (50) from the burner (40) is directed and in which process air is mixed with products of combustion from the flame; the nozzle (52) having hot gas discharge openings (106) through which the hot gases resulting from the mixing action are projected onto articles (10) or other material to be heated.

32 Claims, 8 Drawing Figures

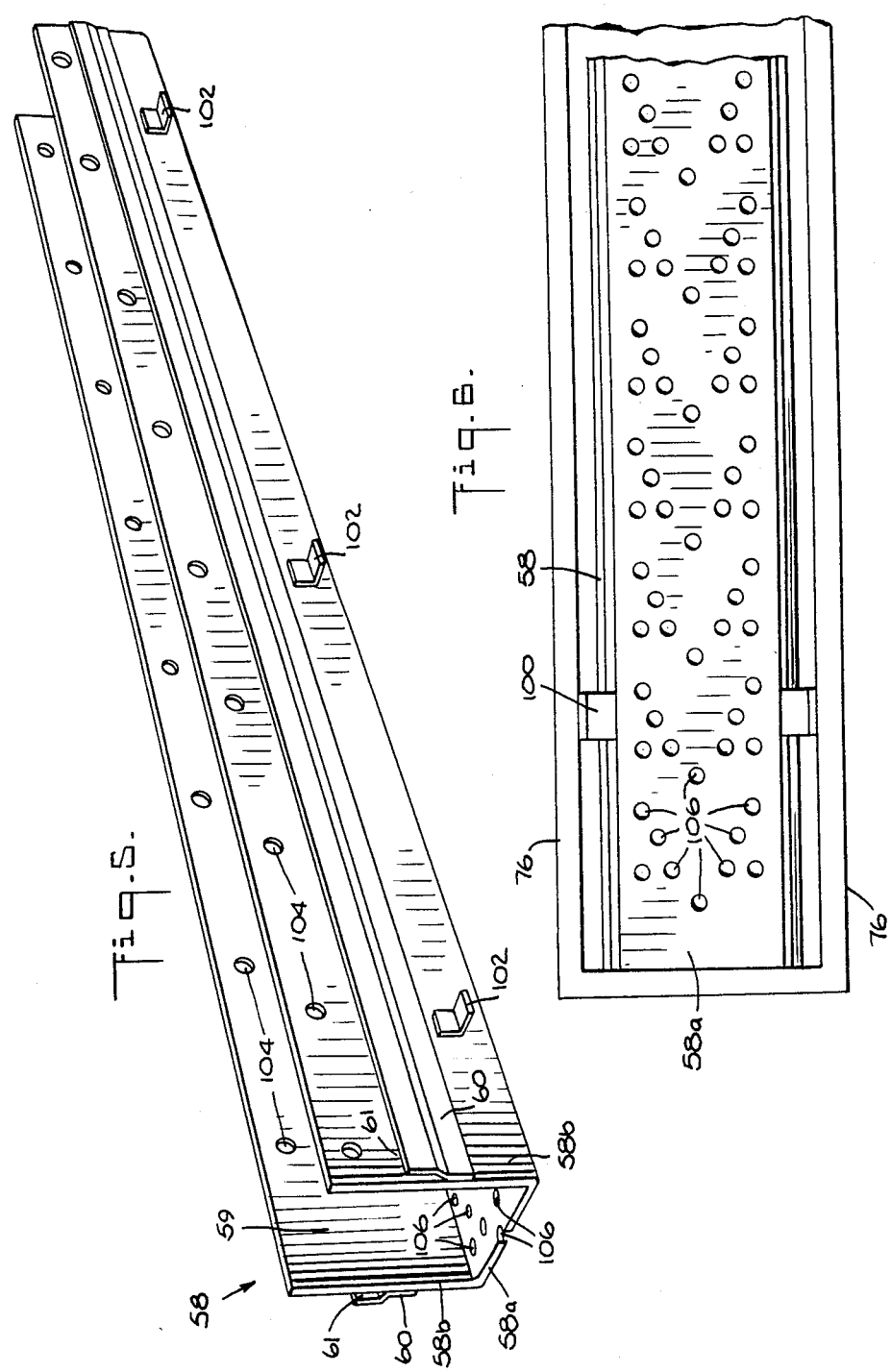

METHOD AND APPARATUS FOR APPLYING HEAT TO ARTICLES AND MATERIALS

BACKGROUND OF THE INVENTION

1. Field of the Invention

This invention relates to novel methods and apparatus for applying heat to articles and materials during processing thereof.

2. Description of the Prior Art

Many manufacturing processes require that certain articles or materials produced be heated in a very precise manner. For example, in the manufacture of welded seam cans to be used for containing food, it is necessary to apply a coating of lining material along the weld seam inside the cans and then to heat the material to cure it. In the interest of speed it is desired to heat the lining material rapidly; however, if the material is heated too rapidly it is likely to blister or deteriorate. It is also important that the heating be confined to the lining material in the region along the weld seams and that it not extend over the entire can. In other manufacturing processes precise amounts of heat at predetermined temperatures must be applied to moving sheets or webs. For example, in the processing of paper or other webs, it is often necessary to apply heat for curing, drying or otherwise treating the web. Where the webs are thin the amount of heat applied to them must be closely controlled and the temperature at which the heat is applied must be maintained within close tolerances, otherwise the web may be ruined.

Direct flame heaters, such as torches, are well known. Direct flame heaters, however, are often not suitable for controlled heating of various articles and materials because of the wide variation of temperature that exists over a small region in the vicinity of the flame. For example, the temperature at the flame tip of a gas burner may be in excess of 1200° C., but just a few millimeters away from the flame tip the temperature may be only a few hundred degrees centigrade.

To overcome the problem of sharp temperature variations in the vicinity of a flame, indirect flame heating arrangements have been employed for most industrial processes. U.S. Pat. Nos. 3,437,322 and 3,541,190 show improvements in indirect flame heating applications. In an indirect flame heating arrangement a flame heater is used to heat a current of air flowing along a duct and the heated air is directed through the duct to the location where heat is to be applied.

Although indirect flame heating arrangements provide uniform temperature over a much larger area than is possible with a gas flame heater, the ducting required for such indirect heating tends to be bulky, especially where it must be insulated. Also, because of the time required for the air to flow through the ducting between the flame heater and the region to be heated, it is not possible to make instantaneous adjustments of temperature or heat output from a conventional indirect flame heater.

Other types of flame heaters which utilize so called "secondary air" to mix with and assist in flame combustion are also well known; and examples of these are seen in U.S. Pat. Nos. 3,794,459, 4,048,927, 4,124,353, 4,156,394, 4,175,919, 4,235,591, 4,278,418 and 4,297,093. None of the devices of those patents however are capable of applying controlled amounts of heat at an even temperature to a precise area.

SUMMARY OF THE INVENTION

The present invention overcomes these shortcomings of the prior art and provides novel methods and apparatus for applying heat to predetermined regions of articles or material to be heated in a closely controlled manner, without loss of heat and without need for special ductwork and associated insulation.

According to one aspect, the invention is carried out by producing a flame, directing the flame into an enclosure formed by the walls of a hot gas discharge nozzle, directing a flow of process air into the enclosure in a manner such that the process air mixes inside the enclosure with the products of combustion from the flame and directing the hot gases of the resulting hot gas mixture through spaced apart openings in one wall of the discharge nozzle to the region to be heated.

In another aspect of the invention there is provided a novel flame type heating apparatus comprising a burner for burning a combustible mixture of fuel and air supplied thereto to produce a flame, a hot gas discharge nozzle having walls forming an enclosure into which the flame is directed and means arranged to supply a flow of process air to the enclosure in a manner to mix therein with the products of combustion from the flame. The hot gas discharge nozzle has a wall formed with hot gas discharge openings for directing hot gases from the enclosure to a region being heated.

In a further aspect of the invention there is provided a novel method of applying heat to material according to a predetermined program of temperatures. This novel method comprises the steps of conveying the material along a given path adjacent a series of flame type heating devices arranged along the path, directing a flow of a combustible mixture of fuel and air to each heating device to produce a flame therein and directing each flame into an enclosure formed by the walls of a hot gas discharge nozzle associated with the device, directing a flow of process air into each enclosure in a manner to mix with the products of combustion of the associated flame, directing the hot gas mixture in each enclosure out through discharge openings in a wall facing the material to be heated and independently controlling the flows of combustible mixture and process air to the heating devices to maintain the temperature of the hot gases discharged from the discharge openings according to the predetermined program of temperatures.

According to a still further aspect of the invention there is provided novel apparatus for subjecting material to heating according to a predetermined program of temperatures. This novel apparatus comprises a conveyor for conveying the material along a given path, a plurality of flame type heating devices arranged along the path and each having hot gas discharge nozzles each formed with a wall facing the material on the conveyor and having hot gas discharge openings in the walls through which hot gases are directed onto the material. Each heating device comprises a burner for burning a combustible mixture of fuel and air to produce a flame, an enclosure formed by the walls of the nozzle into which the flame is directed and means for directing a flow of process air into the enclosure to mix with the products of combustion of the flame and produce a hot gas mixture which is directed through the openings. Means are also provided for independently controlling the flow of combustible mixture and process air to the heating devices to maintain the hot gases being discharged from each device at a temperature corresponding to the predetermined program of temperatures.

In more specific aspect the invention provides for the return flow of hot gases from the articles or material being heated back around the discharge nozzle in order to insulate the nozzle and also to limit the region to which heat is applied without need for special physical insulation.

Other specific features and aspects of the invention are described and shown hereinafter and are set forth in the various claims. In addition, as will be appreciated from a reading of the following detailed description of the preferred embodiment, additional modifications and embodiments can be incorporated within the spirit and scope of the invention.

BRIEF DESCRIPTION OF THE DRAWINGS

A selected embodiment of the invention has been chosen for purposes of illustration and description, and is shown in the accompanying drawings, forming a part of the specification, wherein:

FIG. 5 is a perspective view of the nozzle portion of the burner section of FIG. 2;

FIG. 6 is a fragmentary bottom view taken along line 6—6 of FIG. 4; and

DETAILED DESCRIPTION OF THE PREFERRED EMBODIMENT

Figure 1:
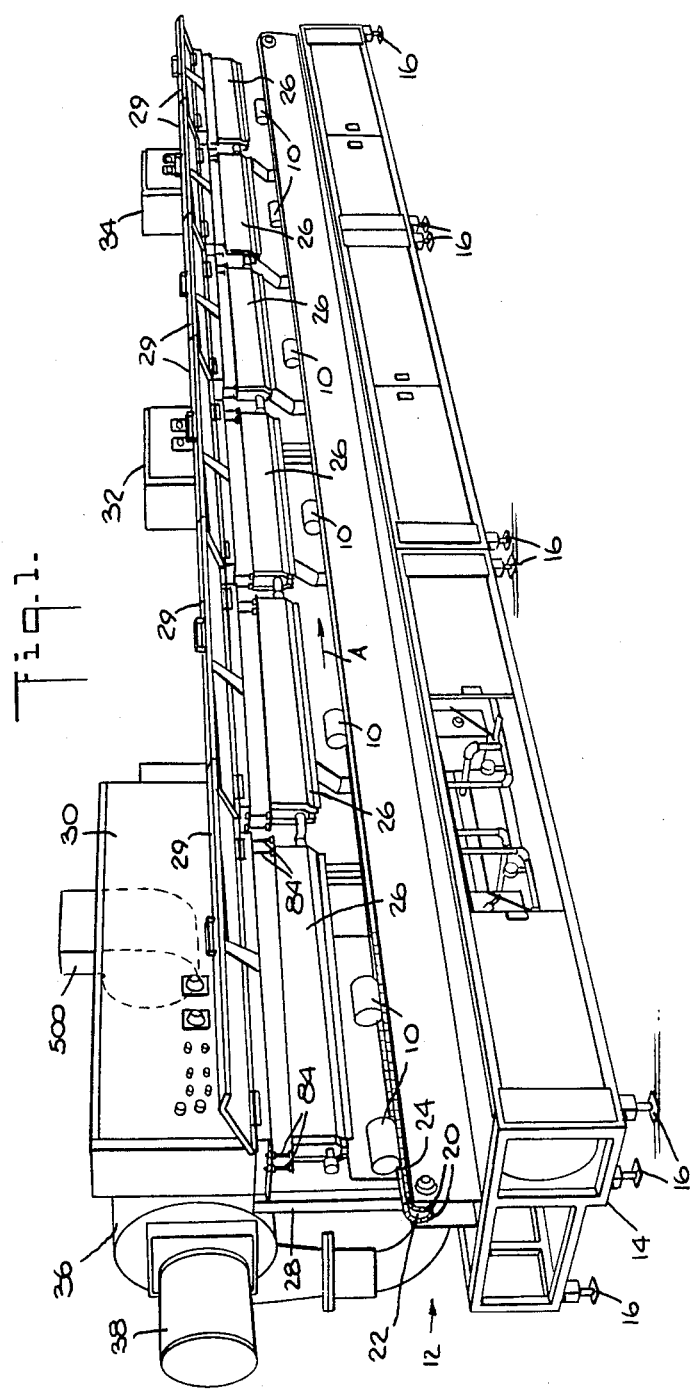
FIG. 1 is a perspective view of a can weld seam heating system embodying the present invention.

The heating system of FIG. 1 is used for applying heat to the upper surfaces of horizontally disposed cans 10 which are carried along one behind the other in the direction of an arrow A on a conveyor 12. As shown, the conveyor 12 is mounted onto a frame 14 mounted on legs 16. On the upper surface of the frame 14 there is provided a conveyor channel 18 which supports sprockets 20 at each end. A pair of endless conveyor chains 22 and 24 extend around the sprockets and extend parallel to each other along the channel 18. The sprockets 20 are driven by a suitable motor drive (not shown) so that the upper spans of the two chains move along at the same speed in the direction of the arrow A. The cans 10 are held on by magnets under the chains and are carried along by the upper spans of the chains 22 and 24.

A series of heater assemblies 26 are arranged in a line just above the conveyor 12. These heater assemblies are supported on an upper frame 28 which is connected to the conveyor support frame 14. As can be seen, the various heater assemblies 26 are elongated and extend just above the cans 10 carried on the conveyor 12. A series of hinged panels 29 are also mounted on the upper part of the upper frame 28. These panels are shown in the open position to expose the heater assemblies 26 but in operation of the system the panels 29 swing down to cover the sides of the heater assemblies.

A main control panel 30 and auxiliary control panels 32 and 34 are mounted on the upper frame 28 just above the heater assemblies 26. A process air blower 36 is mounted just behind the main control panel 30. Air enters the blower 36 through a process air filter 38. An exhaust air fan 500 is mounted behind the main control panel 30.

The heater assemblies 26 are all of the same construction but are individually temperature controlled from the control panels 30, 32 and 34. This permits the generation and maintenance of a programmed temperature gradient through which the cans 10 pass as they move along the conveyor 12.

Figure 2:
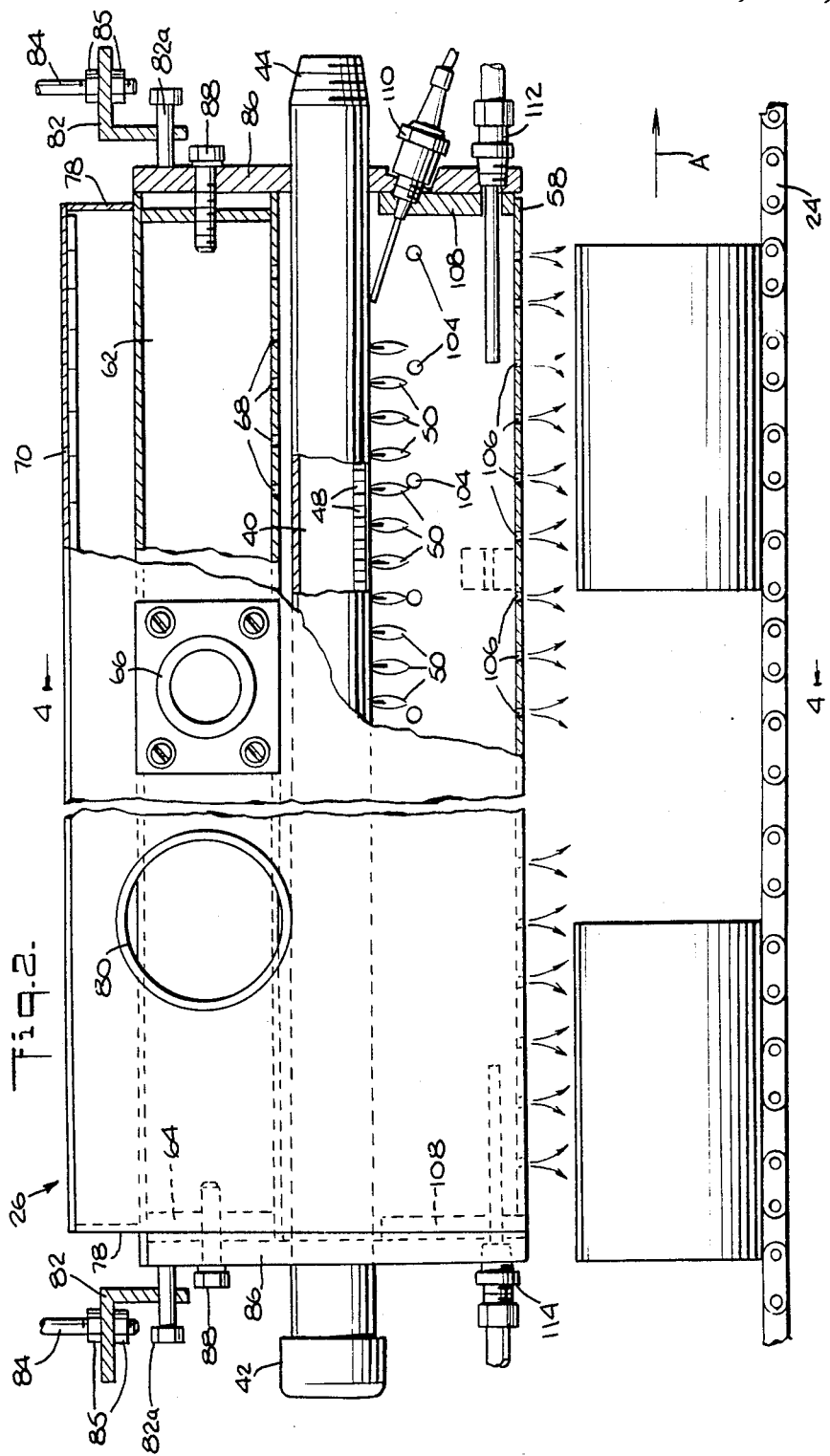
FIG. 2 is a fragmentary elevational view, partially cut away, and showing a burner section used in the system of FIG. 1.
Figure 3:
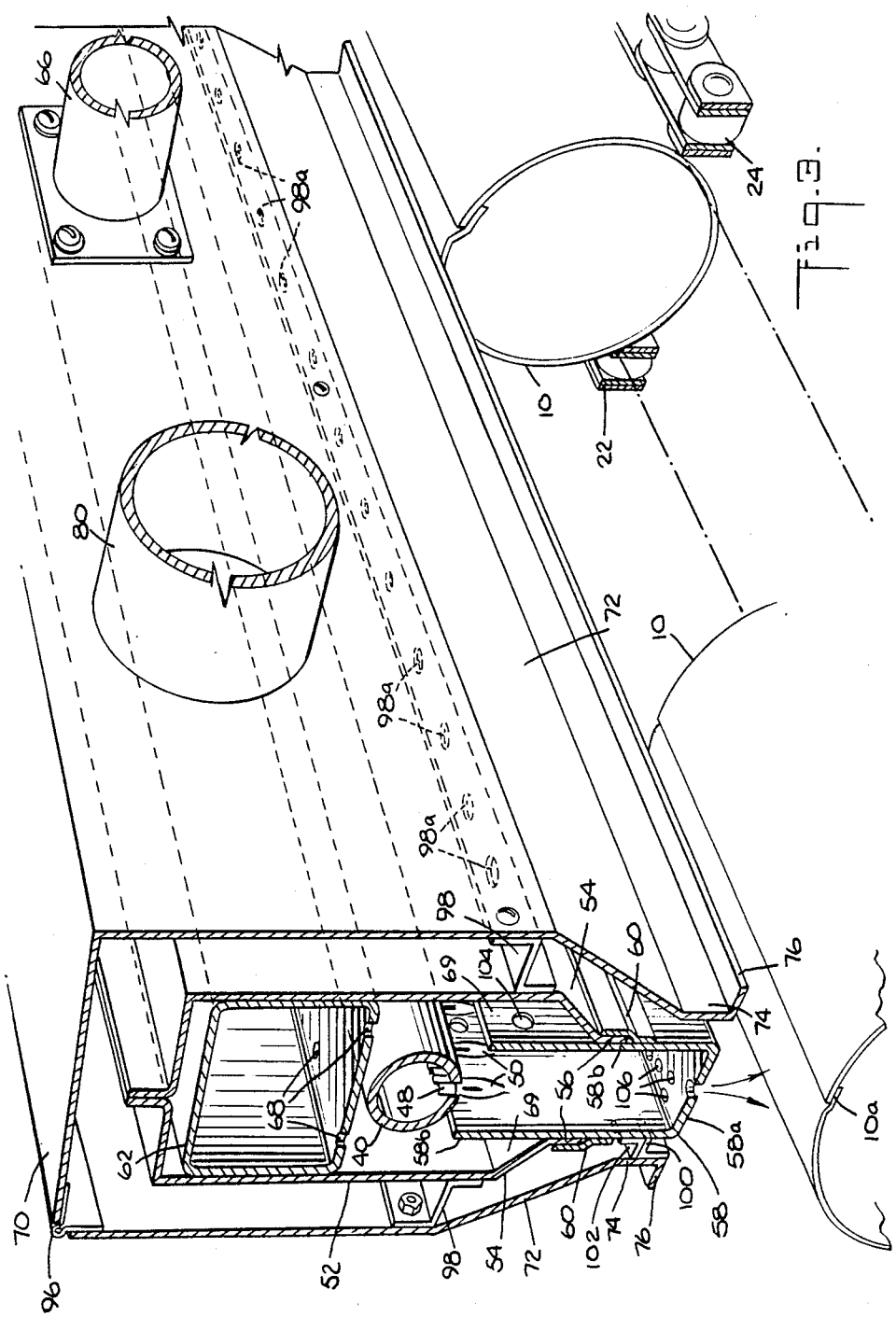
FIG. 3 is a perspective view of the burner section of FIG. 2.
Figure 4:
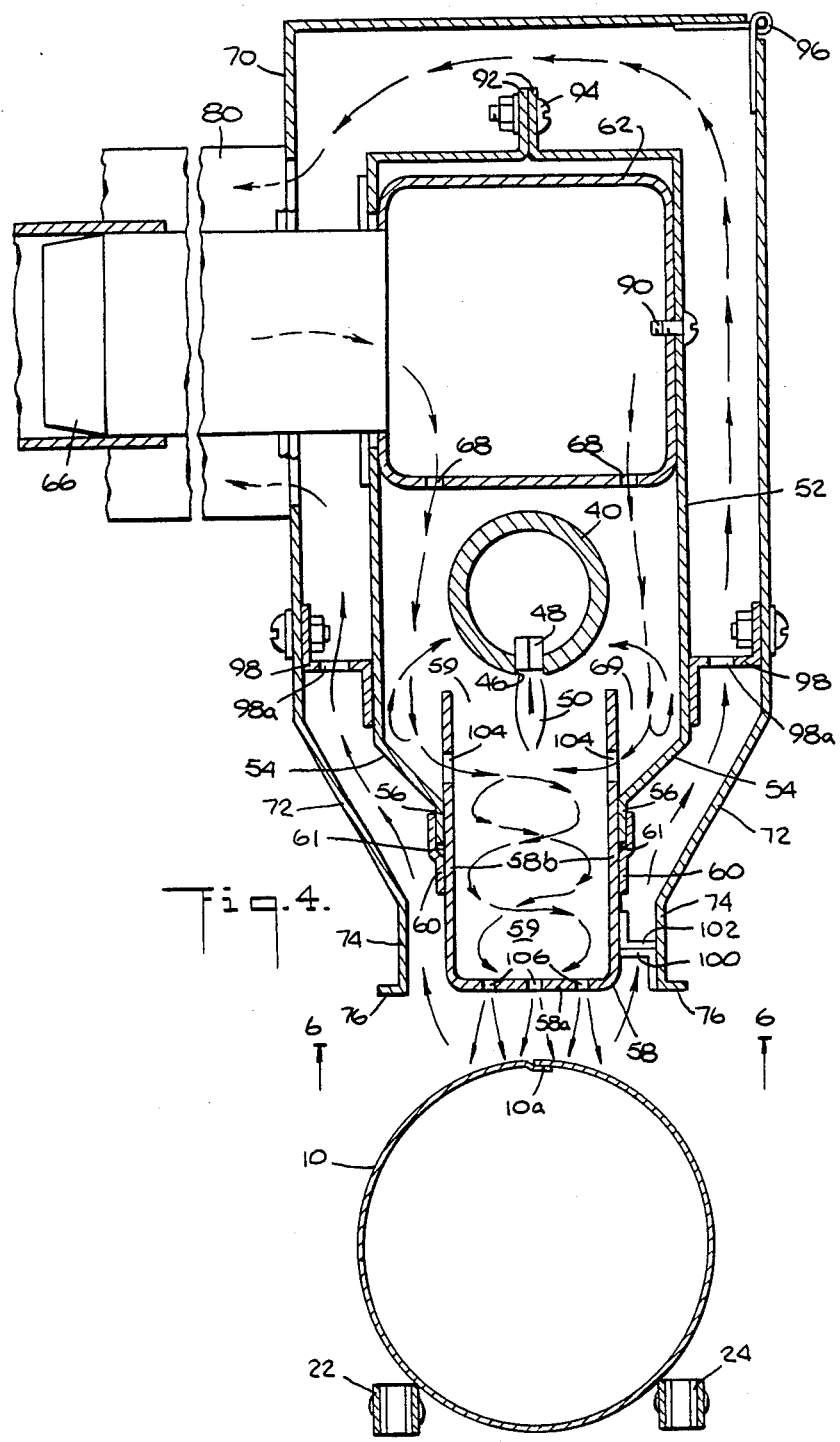
FIG. 4 is a enlarged cross section view taken along line 4—4 of FIG. 2.

The construction of the heater assemblies 26 is best seen in FIGS. 2-6. As shown in FIGS. 2-4 there is provided a pipe burner 40 which extends over the length of the heater assembly and parallel to the conveyor chains 22 and 24. The pipe burner 40 per se is known. It is provided with a cap 42 at one end and the other end 44 is connected to a fuel/air source (not shown). An elongated slot 46 (FIG. 4) is formed along the bottom of the pipe burner 40; and a corrugated steel ribbon assembly 48 is fitted into the slot to form a plurality of small, precisely sized and closely spaced burner orifices which support individual flames 50 (FIG. 2) along the bottom of the pipe burner 40.

A hot air shroud 52 (FIGS. 3 and 4) extends around the pipe burner 40. As can be seen, the hot air shroud tapers inwardly at 54 on each side at a distance below the pipe burner 40 and from there the hot air shroud is formed with downwardly extending flanges 56. An elongated air discharge nozzle 58 of U-shaped cross section fits between the flanges 56 of the hot air shroud 52 as shown in FIGS. 3 and 4. Elongated shroud attachment clips 60 are welded to the outer side surfaces of the nozzle 58 and form therewith slots 61 into which the flanges 56 of the hot air shroud 52 are fitted. This arrangement serves to maintain the nozzle 58 in assembly with the shroud 52 and at the same time it accomodates differential longitudinal expansion which occurs in operation due to the nozzle 58 being closer to the flames 50 than the shroud 52. As can be seen the slots 61 open upwardly so that the nozzle 58 can be disassembled from the shroud 52 by pulling the nozzle downwardly.

A process air header 62 of square cross section extends above the pipe burner 40. As shown in FIG. 2, the ends of the process air header 62 are closed by header end plates 64 which are welded in place. A process air inlet pipe 66 is connected to the process air header 62 along one side thereof and is connected to receive process air from an external source (not shown). The process air header 62 is also formed with a plurality of process air outlet holes 68 in its lower surface on opposite sides of the pipe burner 40.

An exhaust air shroud 70 extends around the hot air shroud 52. The hot air shroud is inwardly tapered at each side near the bottom thereof as shown at 72. The bottom of the exhaust air shroud 70 is formed with downward extensions 74 and outwardly extending flanges 76 in line with the bottom of the U-shaped discharge nozzle 58.

As shown in FIG. 2, the ends of the exhaust shroud 70 are closed by exhaust shroud end plates 78 which are welded in place. An exhaust connection 80 is welded to the side of the exhaust air shroud 70 and is arranged to be connected to an exhaust duct (not shown).

Support brackets 82 are bolted to the exhaust shroud end plates 86 via shoulder bolts 82A; and hangar rods 84 from the upper frame 28 (FIG. 1) pass through the brackets 82 and are held in place by nuts 85 to support the entire heater assembly 26.

The ends of the hot air shroud 52 are closed by hot air shroud end plates 86 and these end plates are bolted to the header end plates 64 by means of bolts 88. As can be seen in FIG. 2, the exhaust air shroud 70 and exhaust air shroud end plates are supported by the process air header 62 and by support spacing clips 98. Likewise the hot air shroud 52 is supported by virtue of its end plates 86 being bolted to the header end plates 64. Finally, the pipe burner 40 extends through and is supported by the hot air shroud end plates 86.

As can be seen in FIG. 4 the hot air shroud 52 is made in two pieces which are held to the vertical sides of the process air header 62 by means of screws 90. Also, the upper ends of the two pieces of the hot air shroud 52 are bent upwardly to form mating flanges 92 which are bolted together by means of nut and screw-assemblies 94.

As can also be seen is FIGS. 3 and 4, one side of the exhaust shroud 70 is connected by means of a longitudinal hinge 96 to the top of the shroud. This permits the side of the exhaust shroud to be swung up and away from the hot air shroud to permit access to the hot air shroud for inspection and test.

The exhaust shroud 70 is provided, just above its inwardly tapered portions 72, with long spacer channels 98 which hold the exhaust shroud spaced away from the hot air shroud to permit evenly distributed flow of exhaust gases in the region between the two shrouds, by means of a series of exhaust holes 98A along the length of the channels.

The exhaust shroud 70 and the discharge nozzle 58 are also provided near the bottoms thereof with spaced apart cooperating clips 100 and 102, respectively. The clips 102 on the nozzle 58 rest on the clips 100 on the exhaust shroud 70 so that the discharge nozzle is supported by the exhaust shroud. This support arrangement also accomodates differences in relative expansion between the discharge nozzle and the exhaust shroud due to the difference temperatures they experience in operation of the burner.

The construction of the discharge nozzle 58 is shown in greater detail in FIGS. 5 and 6. As can be seen the discharge nozzle is formed with a flat bottom or hot gas discharge wall 58a and two upwardly extending side walls 58b. These walls form an enclosure 59 into which the flames 50 from the burner 40 are directed. The shroud attachment clips 60 are arranged to extend along the outer surfaces of the side walls 58b about half way between the top and bottom of the walls. A plurality of process air inlet openings 104 are formed in the side walls 58b above the attachment clips 60. As will be explained more fully hereinafter the openings 104 admit process air to mix with the products of combustion from the burner flames 50 in the enclosure 59. In order to maximize this mixing the openings 104 on one of the walls 58b are offset in the longitudinal direction relative to the openings in the other wall as shown in FIG. 5. With this arrangement, the air entering the enclosure 59 via the openings 104 causes a swirling motion inside the enclosure to ensure good mixing of the process air with the products of combustion from the flames 50.

As shown in FIG. 6 the hot gas discharge wall 58a of the nozzle 52 is formed with a plurality of hot gas discharge openings 106. These openings are arranged according to a pattern corresponding to the rate at which heat is to be applied to different locations on the articles or material to be heated. That is, in locations where the openings 106 are arranged close to each other a greater amount of heat output is produced as compared to the locations where the openings 106 are spaced farther apart. In the illustrated embodiment the openings 106 near the edges of the wall 58a are arranged closer to each other than the openings near the center of the wall. This is because the weld seams of the cans 10 pass under the center of the hot gas discharge wall 58a and, since the weld seams have already been heated from the welding they do not have to be heated as much as the regions adjacent thereto. Accordingly, to produce such a pattern of heating the openings 106 are distributed more densely near the edges of the hot gas discharge wall 58a and more sparsely near the center of the wall.

Reverting now to FIG. 2, it will be seen that nozzle end plates 108 are provided at the ends of the discharge nozzle 58 to contain the gases therein and cause them to be directed out through the discharge openings 106.

It will also be seen in FIG. 2 that there is provided a sparking device 110 (known per se) which is mounted in and extends through one of the hot air shroud end plates 86. The end of the sparking device 100 is positioned to cause a spark to be emitted at one end of the ribbon assembly 48 of the pipe burner 40 to start operation of the burner. The sparking device is supplied with electrical power from a suitable external source (not shown). A thermocouple 112 is also mounted to extend through the same shroud end plate 86 as the sparking device 110; but the thermocouple is located near the hot gas discharge openings 106. The thermocouple produces electrical signals representative of the temperature of the gases being discharged and those signals are used to indicate such temperatures and to regulate the flow of fuel and air mixture to the pipe burner 40.

At the opposite end of the burner assembly 26 a flame detector 114 (also known per se) is mounted to extend through the opposite shroud end plate 86. This flame detector operates to produce an electrical signal representative of the presence or absence of a flame at the opposite end of the burner. When the absence of a flame is detected, a signal is produced which either actuates the sparking device 110 or causes the flow of fuel and air mixture to be terminated.

The operation of the burner assembly 26 is best seen in FIG. 4. As indicated, a combustible mixture of fuel and air is supplied to the pipe burner 40 and this mixture supports flames 50 which project down from the ribbon assembly 48. As shown, the flames 50 terminate, and combustion is completed, at a location slightly above the process air inlet openings 104. The hot gases constituting the products of combustion, however, project from the flames down into the enclosure 59 formed by the walls of the discharge nozzle 58.

In the meantime, process air is supplied via the process air inlet pipe 66 to the process air header 62 and through the outlet holes 68 to the region inside the hot air shroud 52 just above the pipe burner 40. This process air passes down around each side of the pipe burner and is thereby directed into V-shaped cavities 69 formed between the side walls 58b of the hot air discharge nozzle 58 and the inwardly tapering portions 72 of the exhaust air shroud 70. Some of the process air recirculates back out of the V-shaped cavities and flows back up and over the upper edges of the discharge nozzle side walls 58b. However, most of the process air flows through the process air inlet openings 104 and into enclosure 59 just below the flames 50. It will be noted that the flames 50 project downwardly into the nozzle enclosure 59 while the process air flows laterally into the enclosure. This lateral flow of process air entering the enclosure from opposite directions at longitudinally offset locations at each side of the enclosure cooperate with the downward flow of products of combustion from the flames 50 to provide a swirling action which ensures good mixing in the enclosure so that a hot gas mixture of uniform temperature is provided inside the enclosure. The process air is supplied at a positive pressure, e.g., 3.0 inches of water (7.62 gm/cm$^2$) so that the hot gases will project at a high velocity out through the hot gas discharge openings 106. In order to sustain the flames 50 in the environment of this positive backpressure the combustible mixture of fuel and air which is supplied to the pipe burner 40 is regulated to be at an even higher pressure.

As shown in FIG. 4, a can 10 is carried along by the conveyor chains 22 and 24 in such an orientation that a weld seam 10a of the can is located in the uppermost position and passes just under the hot gas discharge wall 58a of the discharge nozzle 58. The hot gases from the discharge openings 106 are directed at high velocity at the can 10. Although the gases from each opening are at the same temperature, more gases flow out from the edges of the discharge nozzle than from the center. This applies more heat to the regions adjacent the weld seam 10a than to the weld seam itself. As indicated above this compensates for the fact that the weld seam is already heated as a result of the welding operations.

After the hot gases impinge upon the can 10 they are then drawn back up into the region between the hot air shroud 52 and the exhaust shroud 70. These gases than pass up along the outer surfaces of the discharge nozzle side walls 58b and then out through the exhaust connection 80. This return air flow provides two benefits. Firstly, it confines the flow of hot air in the region where heat is to be applied so that nearby regions are not excessively heated. Secondly, the return flow of hot air along the outer surfaces of the discharge nozzle side walls provides an insulating effect so that heat loss from the side walls of the discharge nozzle is minimized.

Figure 7A:
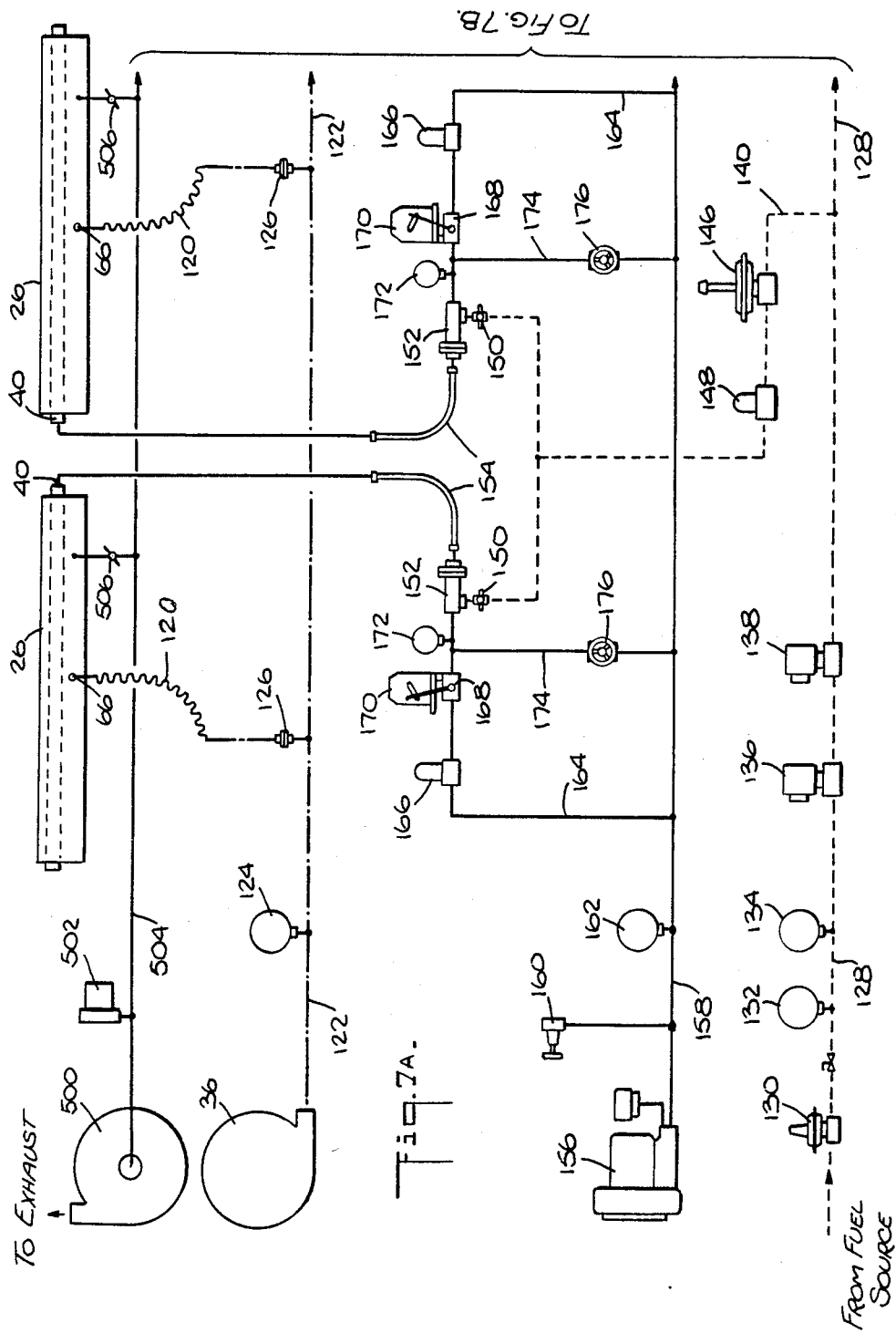
FIGS. 7A and 7B together form a schematic of a combustion mixture and process air supply system for the heating system of FIG. 1.
Figure 7B:
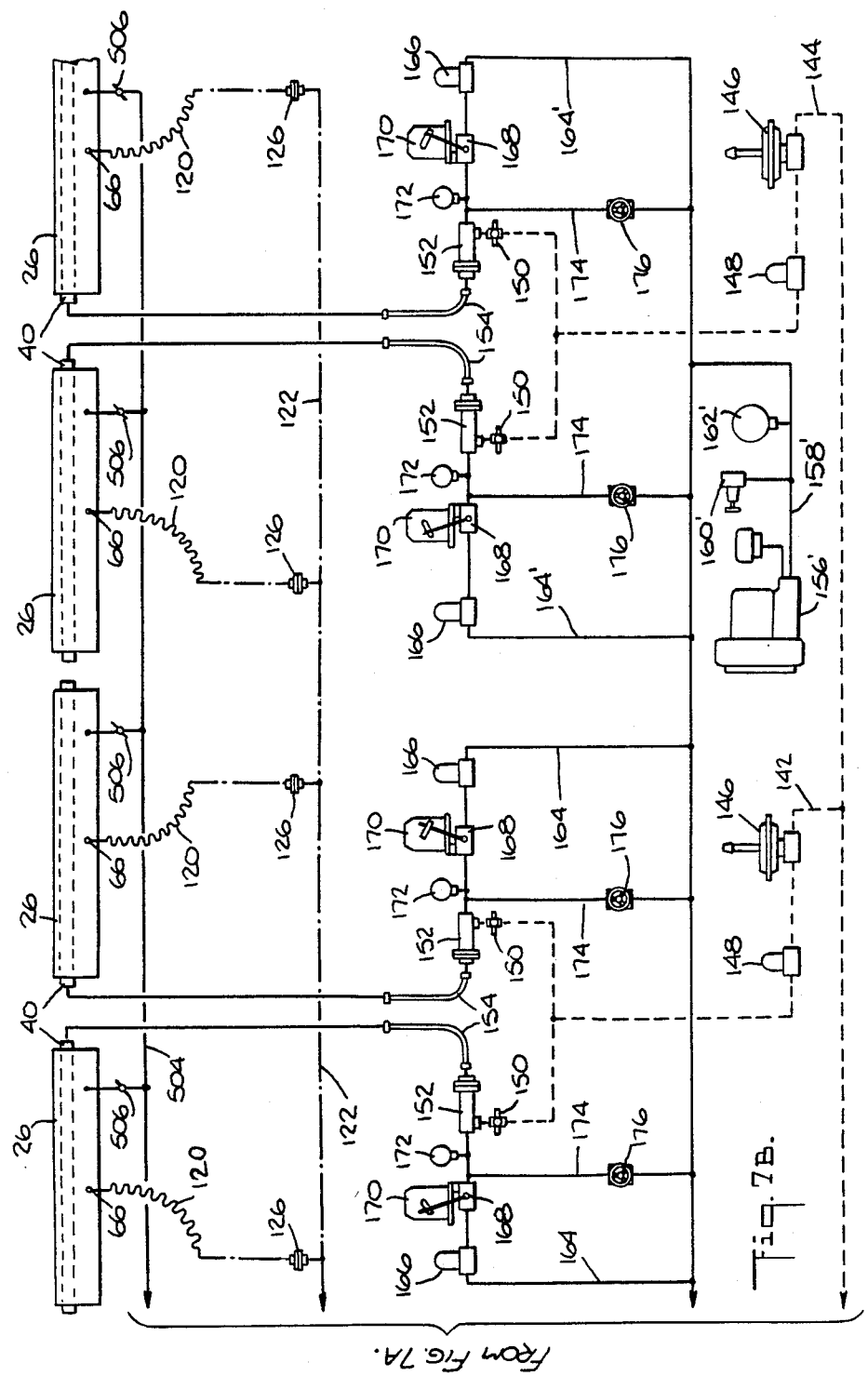

The arrangements for supplying a combustible mixture of fuel and air and for supplying process air to the six heater assemblies 26 are shown schematically in FIGS. 7A and 7B. As shown, each heater assembly has its process air inlet pipe 66 connected via a flexible tubing 120 to a common process air supply conduit 122. The process air supply conduit is connected to the process air blower 36. In the illustrated embodiment the process air blower 36 has a capacity of 1120 cubic feet (31.72 cubic meters) per minute at 0.6375 pounds per square inch (44.82 gm/cm$^2$) and it is driven by a three phase, five horsepower (3.7 kilowatt) motor. An air pressure switch 124 is arranged in the common process air supply conduit 122. This switch has normally open contacts which close when the pressure in the conduit 122 reaches normal operating range. When the switch contacts close the combustible mixture of fuel and air is supplied to the heater assemblies 26. The flow of process air to each heater assembly is controlled by an orifice 126 arranged at the inputs to the flexible tubing 120 leading to each heater assembly.

There is also provided a common fuel line 128 connected to a source of fuel (not shown). In the illustrated embodiment the fuel source is a natural gas supply. The fuel passes through a pressure reducing regulator 130 such as a Fisher Type 730C-10 1.25 inch pressure reducing regulator with a one half inch (1.3 cm) orifice providing gas at a pressure of six to eight inches of water column (15.3-20.3 gm/cm$^2$). There are also provided in the fuel line 128 high and low gas pressure switches 132 and 134. In the illustrated embodiment these switches are, respectively, a HON-C437-D-1005 high gas pressure switch with mannual reset and normally closed contacts set to open at a pressure of fourteen inches of water (35.5 gm/cm$^2$) and a HON-C437H low gas pressure switch with normally open contacts set to close at a pressure of three inches of water (7.65 gm/cm$^2$). These high and low gas pressure switches produced signals to open and close valves 136 and 138 in the fuel line 128 so that fuel will flow to the heater assemblies 26 only so long an the pressure of the incoming fuel is between three and fourteen inches of water (7.65-35.5 gm/cm$^2$).

Downstream of the valves 136 and 138 there are provided three branch lines 140, 142 and 144. Each branch line is provided with an associated gas regulator 146 and a solenoid gas valve 148. In the illustrated embodiment the gas regulator 146 is a Flynn No. 66 BZR zero gas regulator and the solenoid gas valve 148 is an ASCO-8210-D95 three quarter inch (1.9 cm) solenoid gas valve.

The branch lines 140, 142 and 144 each further branch to supply fuel to separate heater assemblies 26. Each further branch line is provided with a manual shut off valve 150 and is connected to a fuel-air mixer 152 such as a Flynn No. 6 FUM-9 Unimixer. The fuel mixer 152 mixes the fuel with an approriate amount of air needed for complete burning and directs the resulting combustible mixture through a flexible metal hose 154 to the pipe burner 40 of an associated heater assembly 26.

A combustion air blower 156 is also provided to supply combustion air for mixing with the fuel in the fuel-air mixer 152. In the illustrated embodiment the blower 156 is a Rotron No. DR 505A5 air blower driven by a two horsepower (1.49 kilowatt) motor. The combustion air blower output is directed along a combustion air line 158. A relief valve 160, for example, a Fisher Relief Valve one inch (2.54 cm) Type 289H with a spring range of one to four and one half pounds per square inch (70.31-316 gm/cm$^2$) is provided in the line 158. In addition there is also provided in the line 158 an air pressure switch 162 such as an HON-C437H-1001 air pressure switch with normally open contacts set to close at a pressure of 25 inches of water (63.5 gm/cm$^2$).

An exhaust air fan 500 is provided to create a suction of 2 inches of water column and exhaust 1200 cubic feet (33.98 cm$^3$) per minute of hot air at 450° F. (232° C.).

The exhaust air fan 500 is connected to a duct 504 which provides a low loss path for all exhaust air. The exhaust pressure is monitored by a pressure switch 502 set for 1.5 inches of water column (3.8 gm/sq cm). The flow from each heater assembly 26 can be partially regulated using an exhaust damper 506. Part of the exhaust damper 506 is cut away so that there is always a minimum exhaust flow.

Downstream of air pressure switch 162 the combustion air line 158 is connected to individual branch lines 164 for four of the heater assemblies 26. The other two heater assemblies are supplied with combustion air from a separate blower 156' along a separate combustion air line 158' provided with a separate relief valve 160', air pressure switch 162' and individual branch lines 164'.

Each branch line is provided with a solenoid air valve 166 such as an ASCO-8115B50 one inch (2.50 cm) solenoid air valve which is connected to be closed by signals from the air pressure switch 162 when the pressure of the combustion air falls below 25 inches of water (63.5 gm/cm²).

Downstream of each solenoid air valve 166 there is provided a combustion air butterfly valve 168, such as a No. 8TBV-CMAP—one inch (2.54 cm) butterfly valve. This valve is arranged to be controlled by an electric motor 170 to regulate the flow of combustion air to the fuel-air mixer 152. The motor in turn is connected to be driven in accordance with signals from the thermocouple 112 (FIG. 2) in the associated heater assembly 26 to regulate the temperature produced in the burner. That is, when the thermocouple senses a lowering in temperature it produces a signal which causes the motor 170 to cause the butterfly valve 168 to open and allow additional air to flow to the fuel-air mixer 152. As additional air flows through the mixer it draws additional fuel so that a greater amount of fuel and combustion air flow to the heater assembly 26.

There is also provided a pressure gage 172 between the butterfly valve 168 and the fuel-air mixer 152. In addition, a further air line 174 with an associated gate valve 176 is arranged to bypass each solenoid air valve 16 and associated butterfly valve 168 to permit a manually set flow of combustion air for either a fixed pressure operating condition or a reduced (standby) heat operating condition).

The hot air shroud 52, the hot gas discharge nozzle 58, the process air header 62 and the exhaust shroud 70 of each heater assembly 26 are all preferably made of stainless steel. The relative dimensions of these items will, of course, vary according to the application for which the burner assembly is to be used. In the illustrated embodiment, where the heater assemblies 26 are used to heat cans in order to cure the coating material applied over the can weld seams, the following dimensions were chosen and found to be satisfactory:

- Length of heater assembly 26—52 inches (1.32 m)
- Diameter of pipe burner 40—1 inch (2.54 cm)
- Width of hot air shroud 52—2.5 inches (6.35 cm)
- Height of hot air shroud 52 and hot gas discharge nozzle 58—6.75 inches (17.14 cm)
- Height and width of process air heater 62—2.5 inches (6.35 cm)
- Width of hot gas discharge nozzle 58—1.5 inches (3.8 cm)
- Height of hot gas discharge nozzle 58—2.5 inches (6.35 cm)
- Width of exhaust shroud—4 inches (10.16 cm)
- Height of exhaust shroud 70—7.87 inches (20 cm)

In addition, the process air outlet openings 68 in the process air header 62 are 0.125 inches (3.17 mm) in diameter and are spaced apart from each other by one half inch (1.27 cm) in a line along each side of its bottom wall. Also the process air inlet openings 104 in the side walls 58b of the hot gas discharge nozzle 58 are 0.250 inches (6.35 mm) in diameter and their centers are spaced from each other by two inches (5.08 cm) in a line along the length of the walls 58b and about 0.625 inches (1.59 cm) from the upper edge of the walls. As mentioned above the air inlet openings 104 in one side wall are staggered relative to the openings in the opposite side wall so that the air entering the nozzle enclosure 59 through these openings produces a swirling and mixing action with the products of combustion of the flames 50.

In the illustrated embodiment, the hot gas discharge openings 106 in the bottom wall 58a of the hot gas discharge nozzle 58 are 0.140 inches (3.56 mm) in diameter and they are arranged in seven rows parallel to the longitudinal axis of the burner nozzle. The openings in the center three rows are spaced one inch (2.54 cm) apart and the openings in the outermost rows are spaced one half inch (1.27 cm) apart. The outermost three rows are spaced apart from each other by one eighth inch (3.17 mm) and one fourth inch (6.35 mm) from the center row. Also, the holes in the center row are offset in the longitudinal direction from the holes in the next adjacent and the outermost rows by one fourth inch (6.25 mm) and the holes in the other rows are offset from in the longitudinal direction from those in the next adjacent and the outermost rows by one fourth inch (6.35 mm).

The dimensions of the various components of the heater assemblies will, of course, vary according to the specific application. For example if a wider area is to be heated, the width of the hot gas discharge wall 58a of the hot gas discharge nozzle 58 may be increased. Also the length of the heater assembly may be increased or decreased. In varying these dimensions it is important that there be maintained a proper special relationship between the flames 50 and the incoming process air so that the process air can mix throughly with the products of combustion from the flames without adversely interferring with the combustion of the flames. Also, the hot air discharge openings 106 must not be so large or so closely spaced as to prevent mixing and distribution of gases inside the burner nozzle prior to exiting from the nozzle. Otherwise the gases exiting from the different hot gas discharge openings will not be at the same temperature.

In instances where an especially wide hot gas discharge nozzle is desired, two or more pipe burners 40 can be arranged adjacent to each other with their flames 50 directed into a common discharge nozzle.

It will be appreciated that the heater assemblies of the present invention permit extremely rapid and close control of the amount of heat produced by the burner and at the same time they permit the temperature of the hot gases to be maintained evenly over a wide area. This makes it possible to maintain a precise temperature profile in a processing operation. For example, in the illustrated embodiment wherein six heater assemblies are used to cure an epoxy coating on can weld seams, the first two heater assemblies may be set to produce hot gases at a higher temperature to bring the weld seam regions very rapidly while the remaining four heater assemblies are set to produce hot gases at a lower temperature to maintain the weld seam regions at a constant temperature until curing has been completed.

In one example, the conveyor 12 was set to bring the cans 10 under the six heater assemblies 26 in a period of twelve seconds; that is each can moved at a rate such that it passed under one burner assembly every two seconds. The curing temperature for the weld seam coating was 500° F. (194° C.) and was to be maintained for 9 seconds. In this case the first two heater assemblies 26 were set to produce hot gases at 1200° F. (684° C.) to bring the can weld seam regions up to 500° F. (294° C.) in the first four seconds of can travel. The last four heater assemblies were set to produce hot gases at a temperature of 600° F. (351° C.) to maintain the can weld seam temperature at 500° F. (295° C.) during the remaining eight seconds of can travel through the heater system.

Adjustment of the temperature profile would permit curing of other (different) coating materials. For example, a laquer would require a slow, steady heating to a peak or final temperature of 475° F. (246° C.).

The temperature of the hot gases from the discharge nozzle 58 is controlled by adjusting the rates of flow of combustion gases (fuel-air mixture) to the pipe burner 40 and by controlling the rate of flow of process air to the hot air shroud 52. To increase the hot gas temperature the rate of flow of combustion gases is increased and the rate of flow of process air is decreased and to decrease the hot gas temperature the rate of flow of combustion gases is decreased and the rate of flow of process gases is increased.

In the illustrated embodiment the hot gas temperature may be varied from about 200° F. (129° C.) to about 1400° F. (795° C.) but normally the temperature range would be between 500° F. (295° C.) to 1200° F. (684° C.). As can be seen the rates of flow of combustion gases and process air are independently controlled in each heater assembly so that any desired program of heating can be achieved.

The rate of heating can be increased or decreased to a certain extent by adjusting the velocity of the hot gases from the discharge nozzle. This is done by adjusting the flow rates of fuel-air mixture to the pipe burner 40 and of the process air to the hot air shroud 52. Of course these rates must be coordinated so as to maintain the desired hot gas temperatures. In the embodiment described herein the velocity of the hot gases can be varied over a range of about 1000 feet (305 m.) per minute to about 5000 feet (1525 m.) per minute.

The burner assemblies 26 may also be inverted and placed between the conveyor sides to cure cans that have been welded on the bottom. The invention permits a compact structure. A combination of simultaneous top and bottom cure may be achieved by the addition of further heater assemblies 26.

Because of the close, accurate and rapid control of temperatures and heat rates which can be applied precisely to predetermined locations with the present invention, the invention is applicable to use in many industrial processes other than the heating of can web seams. For example, where webs or sheets are to be heated either to dry them or to cure or otherwise treat a coating thereon, or a surface thereof, elongated heater assemblies like the assemblies 26 may be arranged to extend transversely of the direction of movement of the web or sheet. In such case sensors upstream and or downstream of the heater assemblies can be arranged to detect the amount of drying, curing or treating to be done in given locations along the web or sheet or to detect whether the drying, curing or treating was adequately carried out; and the outputs of these sensors can be used to adjust the flow of fuel-air mixture and the flow of process air to adjust the appropriate heater assembly temperature and heat output nearly instantaneously to maintain close control of the operation.

I claim:

1. A method of applying heat to a region, said method comprising the steps of producing a flame inside an enclosure formed by the walls of a hot gas discharge nozzle, directing a flow of process air into said enclosure to produce a positive pressure therein and to mix said process air inside said enclosure with the products of combustion from said flame and directing the hot gases of the resulting hot gas mixture out through spaced apart hot gas discharge openings in one wall of said discharge nozzle to the region to be heated, the flame being produced by supplying a combustible mixture of fuel and air to a burner at a pressure sufficient to maintain said flame against the positive pressure produced in said enclosure.

2. A method according to claim 1 wherein the process air is mixed with said products of combustion beyond the flame.

3. A method according to claim 1 wherein said process air is directed into said enclosure in a direction laterally relative to the direction of the flame.

4. A method according to claim 3 wherein said process air is directed into said enclosure from opposite sides thereof.

5. A method according to claim 3 wherein said process air is directed into said enclosure from offset locations on opposite sides thereof to produce a swirling action for enhancing mixing with the products of combustion.

6. A method according to claim 1 wherein said process air is supplied to a hot air shroud which includes said hot gas discharge nozzle and which surrounds said burner.

7. A method according to claim 1 wherein the hot gases, after passing out through the spaced apart hot gas discharge openings, are directed back along the outer walls of the hot gas discharge nozzle.

8. A method according to claim 1 wherein said one wall of said discharge nozzle is elongated, wherein said flame is produced at locations along the length of said one wall and wherein said flow of process air is directed into said enclosure at locations along the length of said one wall.

9. A flame type heating apparatus, said apparatus comprising a burner for burning a combustible mixture of fuel and air supplied thereto to produce a flame, a hot gas discharge nozzle having walls forming an enclosure within which said flame is produced and means arranged to supply a flow of process air to said enclosure in a manner to maintain a positive pressure within said enclosure and to mix therein with the products of combustion from said flame, said hot gas discharge nozzle having a wall formed with hot gas discharge openings for directing hot gases from said enclosure to a region to be heated.

10. A flame type heating apparatus according to claim 9 wherein the hot gas discharge nozzle has side walls formed with process air inlet openings for admitting said flow of process air into said enclosure.

11. A flame type heating apparatus according to claim 10 wherein the process air inlet openings in said side walls are located beyond said flame so that the incoming process air will not affect burning in said flame.

12. A flame type heating apparatus according to claim 10 wherein the process air inlet openings in opposite side walls are offset relative to each other to produce a swirling action for enhancing mixing in said enclosure with the products of combustion.

13. A flame type heating apparatus according to claim 10 wherein a hot gas shroud extends around said burner and contacts said nozzle at locations on opposite side walls between said process air inlet openings and said hot gas discharge openings.

14. A flame type heating apparatus according to claim 13 wherein a process air manifold is arranged in said hot gas shroud, said process air manifold being constructed to receive process air and said process air manifold having openings in one wall arranged to admit process air into said hot gas shroud along opposite sides of said burner.

15. A flame type heating apparatus according to claim 14 wherein the side walls of said hot gas discharge nozzle are displaced from said hot gas shroud in the vicinity of said process air inlet openings to form cavities into which process air from said process air manifold is directed prior to entering said enclosure formed by the hot gas discharge nozzle.

16. A flame type heating apparatus according to claim 10 wherein an exhaust shroud extends around said hot gas discharge nozzle and is spaced therefrom at said hot gas discharge wall to form return passages along said side walls for return of hot gases which have passed through the discharge openings in said discharge wall of said nozzle.

17. A flame type heating apparatus according to claim 13 wherein an exhaust shroud extends around said hot gas discharge nozzle and is spaced therefrom at said hot gas discharge wall to form return passages along said side walls for return of hot gases which have passed through the discharge openings in said discharge wall of said nozzle and wherein said exhaust shroud surrounds said hot gas shroud.

18. A flame type heating apparatus according to claim 17 wherein said exhaust shroud has a side wall that is hinged to a top wall for permitting access to said hot gas shroud.

19. A flame type heating apparatus according to claim 10 wherein the hot gas discharge openings in said hot gas discharge nozzle are distributed along its hot gas discharge wall according to a predetermined pattern of heat application.

20. A flame type heating apparatus according to claim 18 wherein said hot gas discharge nozzle is connected to said hot gas shroud by means of clips which form slots into which the edges of the hot gas shroud extend to accomodate relative expansion from heating.

21. A flame type heating apparatus according to claim 20 wherein said clips form upwardly opened slots to permit said hot gas discharge nozzle to be separated from said hot gas shroud by pulling said nozzle downwardly.

22. A flame type heating apparatus according to claim 21 wherein said exhaust shroud has internal clips which extend under said clips extending out from the side walls of said hot gas discharge nozzle.

23. A flame type heating apparatus according to claim 9 wherein said discharge nozzle is elongated and wherein said burner and said means arranged to supply a flow of process air are also both elongated in the direction of said nozzle whereby mixing of process air and the products of combustion occur along the length of said nozzle.

24. A method of applying heat to articles or material according to a predetermined program of temperatures, said method comprising the steps of conveying said articles or material along a given path adjacent a series of flame type heating devices arranged along said path, directing a flow of a combustible mixture of fuel and air to each heating device to produce a flame therein and directing each flame into an enclosure formed by the walls of a hot gas discharge nozzle assocated with a said device, directing a flow of process air into each enclosure in a manner to mix with the products of combustion of the associated flame and produce a hot gas mixture and directing the hot gas mixture in each enclosure out through discharge openings in a wall facing said articles or material and independently controlling the flows of combustible mixture and process air to said heating devices to maintain the temperature of the hot gases discharged from said discharge openings according to said predetermined program of temperatures.

25. A method according to claim 24 wherein said step of conveying articles or material along a given path comprises moving a series of cans along said path with their weld seams aligned with the path and facing said hot gas mixture.

26. A method according to claim 24 wherein said flows of combustible mixture and process air in the heating devices first encountered by said cans are set to produce a high temperature hot gas mixture for rapidly bringing the region near the can weld seams up to the curing temperature of a coating thereon and wherein the flows of combustible mixture and process air in the remaining heating devices are set to produce a lower temperature to maintain the region near the can weld seams at the curing temperature of said coating.

27. A method according to claim 24 wherein the hot gas mixture discharged from the discharge openings is distributed such that more gases are discharged in the region adjacent the can weld seams than on the can weld seams.

28. A method according to claim 24 wherein the hot gas mixture after contacting the articles or material is directed back along the outside of the hot gas discharge nozzle.

29. Apparatus for subjecting articles or material to heating according to a predetermined program of temperatures, said apparatus comprising a conveyor for conveying said articles or material along a given path, a plurality of flame type heating devices arranged along said path and each having hot gas discharge nozzles formed with walls facing the articles or material on the conveyor and having hot gas discharge openings in said walls through which hot gases are directed onto said articles or material, each heating device comprising a burner for burning a combustible mixture of fuel and air to produce a flame, an enclosure formed by the walls of the nozzle into which said flame is directed and means for directing a flow of process air into said enclosure to mix with the products of combustion of said flame and produce a hot gas mixture which is directed through said openings, and means for independently controlling the flow of combustible mixture and process air to said heating devices to maintain the hot gases being discharged from each device at a temperature corresponding to said predetermined programs.

30. Apparatus according to claim 29 wherein said conveyor comprises a can conveyor constructed to move a series of cans along said path with their weld seams aligned with the path and facing said hot gas discharge openings.

31. Apparatus according to claim 29 wherein said hot gas discharge openings are distributed to allow more hot gases to be directed at regions on said cans adjacent their weld seams than at their weld seams.

32. Apparatus according to claim 29 wherein said flame type heating devices each include an exhaust shroud extending around said hot gas discharge nozzle and spaced on each side from the wall facing the material on the conveyor to form hot gas return paths along the outer walls of the discharge nozzle.

* * * * *

UNITED STATES PATENT AND TRADEMARK OFFICE
CERTIFICATE OF CORRECTION

PATENT NO.    : 4,549,866
DATED         : October 29, 1985
INVENTOR(S)   : Clive W. Granville It is certified that error appears in the above-identified patent and that said Letters Patent is hereby corrected as shown below:

Column 9, line 52, "shroud-4 inches" to read -- shroud 70-4 inches --;

Column 10, line 52, after "seam regions" insert -- of the cans pasing under them to curing temperature --.

Signed and Sealed this

Twenty-eighth Day of January 1986

[SEAL]

Attest:

DONALD J. QUIGG

Attesting Officer

Commissioner of Patents and Trademarks